BEST AVAILABLE COPY
W. P. Wood,
Scroll Saw,
No. 168, A. I. Patented June 23, 1857.
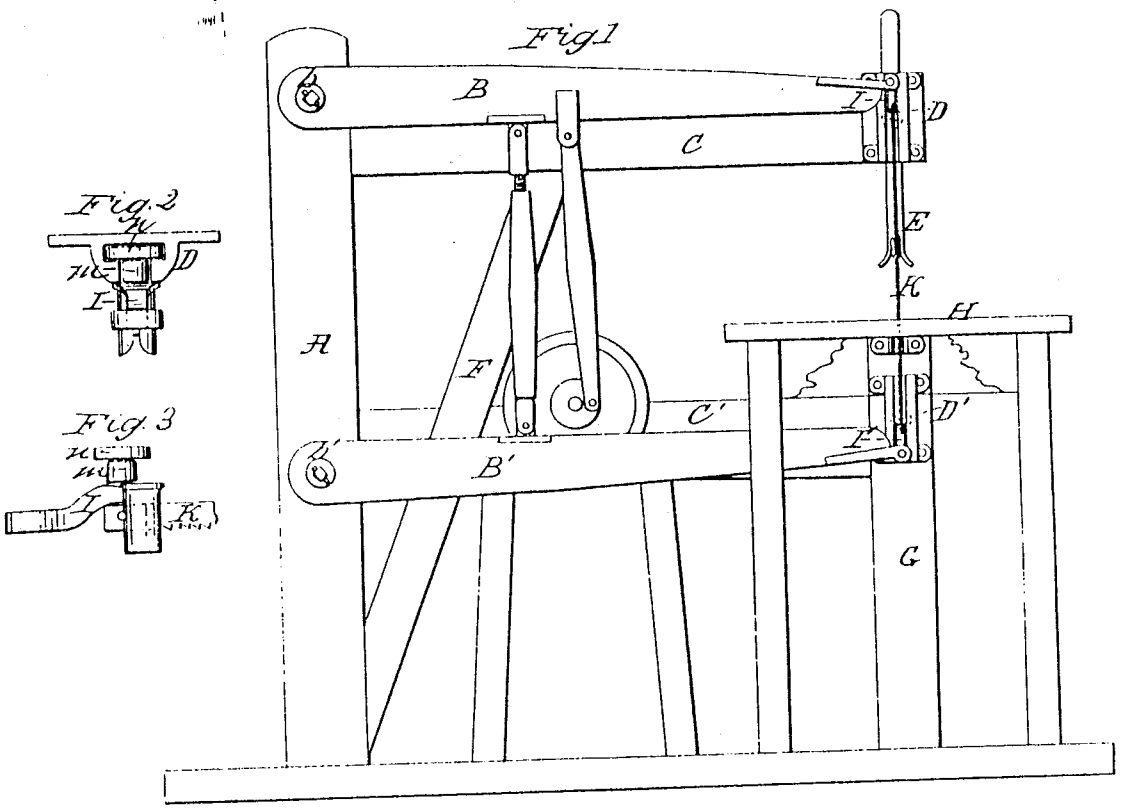
AM. PHOTO-LITHO. CO. N.Y. (OSBORNE'S PROCESS)